Patented Feb. 21, 1950

2,497,876

UNITED STATES PATENT OFFICE 2,497,876

METHOD OF PRODUCING DIRECT POSITIVE PHOTOGRAPHIC IMAGES

George Earle Fallesen and John Spence, Rochester, N. Y., assignors to Eastman Kodak Company, Rochester, N. Y., a corporation of New Jersey No Drawing. Application August 13, 1948, Serial No. 44,215

6 Claims. (Cl. 95—88)

This invention relates to photography and particularly to a method of making direct positive photographs.

Direct positive effects may be produced by solarizing the developable latent image by overexposure, by using a second exposure to obtain the Sabbatier or the Clayden effect or by redeveloping a developed negative image. Solarizable sensitized products require very intense exposures to obtain the desired direct positive photograph. The use of a second exposure has obvious disadvantages from the point of view of practical technique. Redevelopment adds at least two operations to the usual and normal developing procedure.

Fallesen U. S. application Ser. No. 780,405, filed October 17, 1947, describes forming a direct positive image in a suitable silver halide emulsion by exposing the emulsion in the usual way and developing it in a developer which is capable of giving aerial fog. The emulsion is preferably of the internal latent image type such as described in Davey and Knott U. S. patent application Serial No. 790,232, filed December 6, 1947, now abandoned.

The Fallesen application Serial No. 780,405 states that certain optical sensitizing dyes may be added to the emulsion for the purpose of making it more susceptible to aerial fog. With certain sensitizing dyes while strong absorption of the dye to the silver halide grain during exposure is necessary, it is also desirable that the dye be rapidly removed from the grains in the processing solutions.

We have found a class of sensitizing dyes which are particularly useful in the process of the Fallesen application Serial No. 780,405. These dyes are acid merocyanine dyes of the following structure:

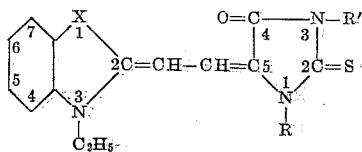

where

X = oxygen or sulfur
R = carboxymethyl or carboxyphenyl,
R' = alkyl, e. g., ethyl or heptyl, or phenyl, and the benzoxazole nucleus may contain other substituents, such as methyl, methoxy, hydroxy, chloro, carbethoxy, or a fused-on benzene ring in the 4,5 or 6,7 positions.

While these dyes include compounds derived from benzoxazole, benzothiazole, substituted benzoxazoles and benzothiazoles, and α-naphthothiazole and β-naphthothiazole, we prefer to use the 5-[(3-ethyl-2-(3)-benzoxazolylidene)-ethyledine]-2-thiohydantoins having a carboxymethyl or carboxyphenyl group in the 1-position of the thiohydantoin ring and an alkyl or phenyl group in the 3-position of the thiohydantoin ring. The following compounds are useful in our invention.

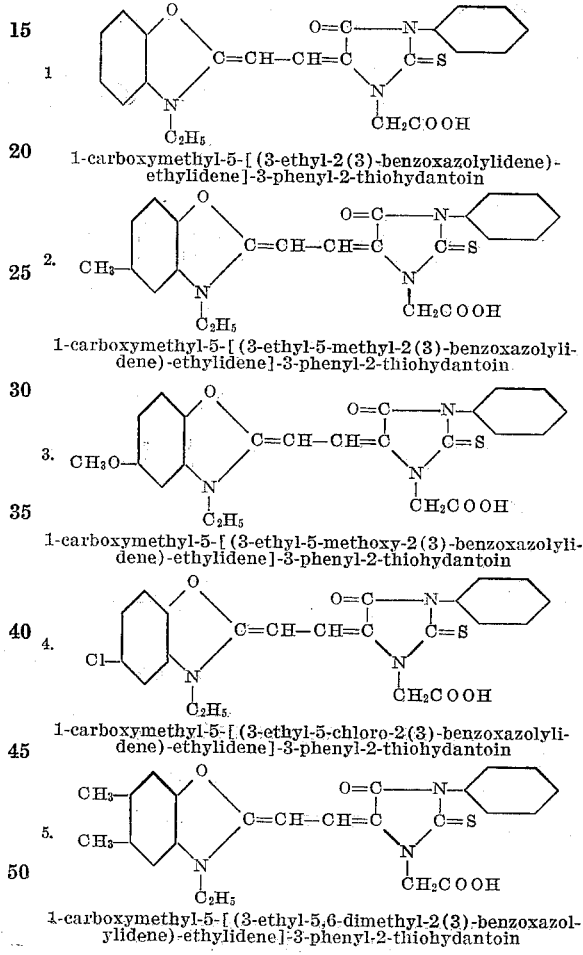

1. 1-carboxymethyl-5-[(3-ethyl-2(3)-benzoxazolylidene)-ethylidene]-3-phenyl-2-thiohydantoin 2. 1-carboxymethyl-5-[(3-ethyl-5-methyl-2(3)-benzoxazolylidene)-ethylidene]-3-phenyl-2-thiohydantoin 3. 1-carboxymethyl-5-[(3-ethyl-5-methoxy-2(3)-benzoxazolylidene)-ethylidene]-3-phenyl-2-thiohydantoin 4. 1-carboxymethyl-5-[(3-ethyl-5-chloro-2(3)-benzoxazolylidene)-ethylidene]-3-phenyl-2-thiohydantoin 5. 1-carboxymethyl-5-[(3-ethyl-5,6-dimethyl-2(3)-benzoxazolylidene)-ethylidene]-3-phenyl-2-thiohydantoin

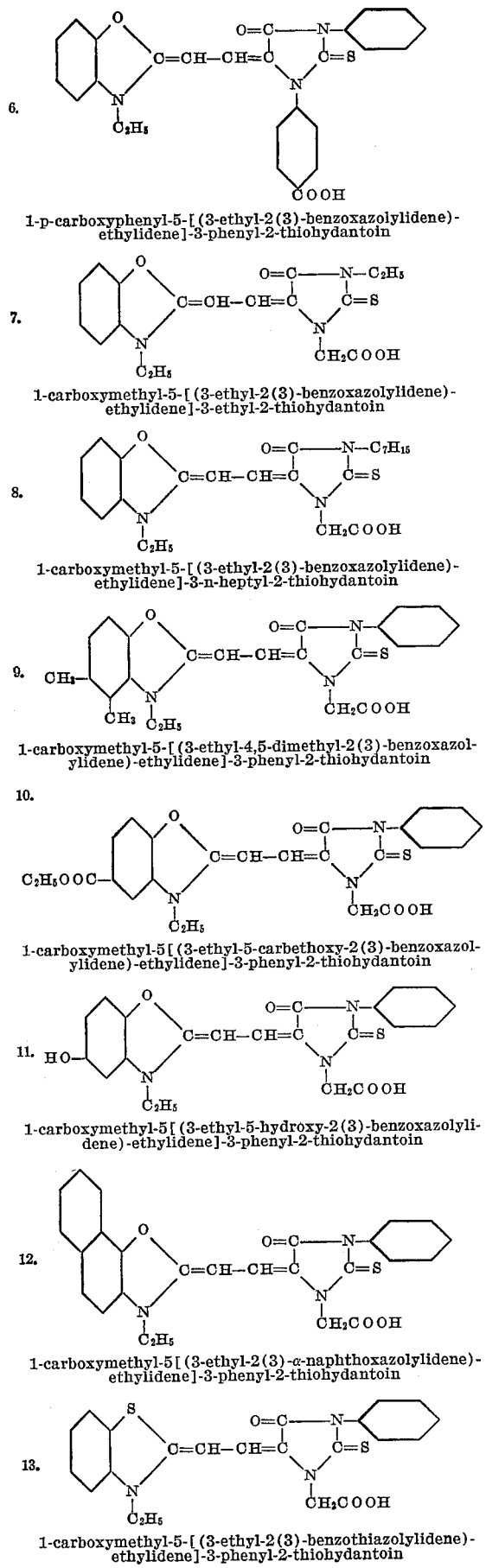

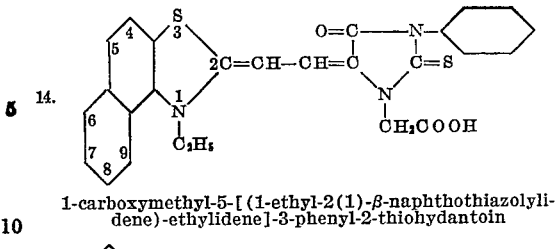

1-carboxymethyl-5-[(1-ethyl-2(1)-β-naphthothiazolyli-
dene)-ethylidene]-3-phenyl-2-thiohydantoin 1-carboxymethyl-5-[(3-ethyl-2(3)-α-naphthothiazolyli-
dene)-ethylidene]-3-phenyl-2-thiohydantoin The compounds used according to our invention may be made as described in Brooker and Keyes U. S. patent application Serial No. 605,473, filed July 16, 1945, now Patent No. 2,493,748, January 10, 1950.

Compound 1 was made as described in U. S. patent application Serial No. 605,473.

Compound 2 was made by the following method:

*1-carboxymethyl-5-[(3-ethyl - 5 - methyl - 2(3) - benzoxazolylidene) ethylidene]-3 - phenyl - 2 - thiohydantoin*

2.24 g. of 2-β-acetanilidovinyl-5-methylbenzoxazole ethiodide (1 mol.), 1.25 g. of 1-carboxymethyl-3-phenyl-2-thiohydantoin (1 mol.), 1.01 g. of triethylamine (2 mol.), and 15 cc. ethyl alcohol were refluxed together 15 minutes. The orange reaction mixture was cooled to room temperature, made acid with concentrated hydrogen chloride, and the dye precipitated with water. After cooling to 0° C., the separated dye was filtered off, and washed with water. A yield of 2.1 g. of crude dye was obtained. After twice precipitating from alcoholic triethylamine with concentrated hydrogen chloride, the orange crystals had a M. P. of 216–217° C. with decomposition.

Compound 3 was made similarly to compound 2, using 2-β-acetanilidovinyl-5-methoxybenzoxazole ethiodide instead of the methyl benzoxazole.

Compound 4 was made similarly to compound 2, using 2-β-acetanilidovinyl - 5 - chlorobenzoxazole ethiodide instead of the methyl benzoxazole.

Compound 5 was made similarly to compound 2, using 2-β-acetanilidovinyl-5,6-dimethylbenzoxazole instead of 5-methylbenzoxazole.

Compound 6 was made by the following method:

*1-p-carboxyphenyl-5-[(3 - ethyl - 2(3) - benzoxazolylidene) ethylidene] - 3 - phenyl - 2 - thiohydantoin*

1.1 g. of 2-β-acetanilidovinyl-benzoxazole ethiodide (1 mol.), 0.8 g. of 1-carboxyphenyl-3-phenyl-2-thiohydantoin (1 mol.), 0.5 g. of triethylamine (2 mols.), and 10 cc. of absolute ethyl alcohol were refluxed together 30 min. The reaction mixture was cooled to room temperature, made acid with concentrated hydrochloric acid, and cooled to 0° C. The dye was filtered off, washed with ethyl alcohol and dried. A yield of 0.6 g. of dye was obtained. After twice precipitating from alcoholic triethylamine with alcoholic hydrogen chloride, the brick red needles had M. P. of 313-15° C. with decomposition.

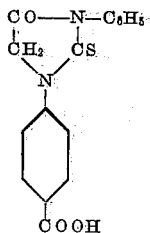

*1-carboxyphenyl-3-phenyl-2-thiohydantoin*

1.9 g. of 1 - carbethoxyphenyl - 3 - phenyl - 2- thiohydantoin was dissolved in 12 cc. of 7½% sodium hydroxide in water by refluxing for 30 seconds. The solution was chilled in ice and water. It was made acid with hydrochloric acid. The reaction mixture was chilled to 0° C. It was filtered and washed well with water and dried. A yield of 1.5 g. of the free acid was obtained of M. P. 278-80° with shrinking from 272°.

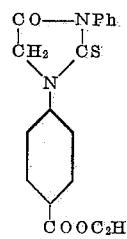

*1-carbethoxyphenyl-3-phenyl-2-thiohydantoin*

11.8 g. of carbethoxyphenyl glycine ethyl ester (1 mol.) and 6.7 g. of phenyl isothiocyanate (1 mol.) were heated 36 hours on a steam bath. The mass was treated with a small amount of ethyl alcohol. The solution was chilled, the solid filtered off and washed with a small amount of ethyl alcohol and dried. A yield of 1.9 g. of M. P. 188-190° was obtained.

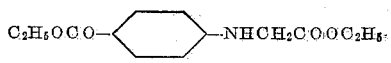

33 g. of ethyl-p-aminobenzoate, 16.7 g. of ethylbromoacetate and 100 cc. of ethyl alcohol were refluxed 48 hrs. The solution was dissolved in water and the solution made alkaline with sodium carbonate. The product was extracted with ether. The ether solution was dried over magnesium sulfate, and the dried material was distilled. A yield of 11.8 g. of B. P. 240-250°/20 mm. was obtained.

Compound 7 was made similarly to compound 2, using 2-β-acetanilidovinylbenzoxazole ethiodide instead of the methyl derivative, and 1-carboxymethyl-3-ethyl-2-thiohydantoin (made as follows) instead of the 3-phenyl derivative:

*1-carbethoxymethyl-3-ethyl-2-thiohydantoin*

8.7 g. of ethylisothiocyanate (1 mol.) was added slowly to 18.9 g. of iminodiacetic acid diethyl ester (1 mol.) with shaking. Considerable heat was evolved and some alcohol boiled from the top of the flask. The mixture was heated 1½ hrs. on a steam bath, and then poured into a beaker. On cooling and stirring, the material solidified. It was broken up and used crude in the preparation of the free acid. 1 g. of the crude ester was recrystallized from methyl alcohol to give 0.6 of fine white needles of M. P. 85-86° C.

*1-carboxymethyl-3-ethyl-2-thiohydantoin*

22 g. of 1-carbethoxymethyl-3-ethyl-2-thiohydantoin (1 mol.) was refluxed with 84 cc. of 10% sodium hydroxide until all was in solution. The solution was filtered, cooled in ice and water and made acid with concentrated hydrochloric acid. The mixture was chilled to 0° C. and the separated solid was filtered off, washed well with water and dried. A yield of 15.2 g. of product was obtained of M. P. 160-163° C.

Compound 8 was made similarly to compound 7, using 1-carboxymethyl-3-n-heptyl-2-thiohydantoin instead of the 3-ethyl derivative. The 1-carboxymethyl-3-n-heptyl - 2 - thiohydantoin was made in the same way as the 3-ethyl derivative, starting with n-heptyl isothiocyanate instead of ethyl isothiocyanate.

Compound 9 was made similarly to compound 2, using 2-β-acetanilidovinyl-4,5-dimethyl-benzoxazole instead of the 5-methylbenzoxazole.

Compound 10 was made similarly to compound 2, using 2-β-acetanilidovinyl-5-carbethoxy-benzoxazole instead of the 5-methylbenzoxazole.

Compound 11 was made similarly to compound 2, using 2-β-acetanilidovinyl-5-hydroxybenzoxazole instead of the 5-methylbenzoxazole.

Compound 12 was made by the following method:

*1-carboxymethyl-5-[(3-ethyl - 2(3) -α-naphthoxazolylidene) ethylidene] - 3 - phenyl - 2 - thiohydantoin*

1.25 g. of 1-carboxymethyl-3-phenyl-2-thiohydantoin (1 mol.), 2.4 g. of 2-β-acetanilidovinyl-α-naphthoxazole ethiodide (1 mol.), 1.35 g. of triethylamine (2 mols.), and 15 cc. of absolute ethyl alcohol were refluxed together for 30 minutes. The orange solution was chilled in an ice-water bath and then made acid with alcoholic hydrogen chloride (0.1 g./cc.). Water was added to precipitate the dye. The mixture was chilled to 0° C., then the separated dye was filtered off and washed with fresh ethyl alcohol. A yield of 1 g. was obtained; which, after twice being taken up in methyl alcohol with the aid of triethylamine and precipitating with alcoholic hydrogen chloride, had a M. P. of 232-3° C., with decomposition. The dye was obtained as an orange powder.

Compound 13 was made similarly to compound 2, using 2-β-acetanilidovinylbenzothiazole ethiodide instead of the 5-methylbenzoxazole ethiodide.

Compound 14 was made by the following method:

*1-carboxymethyl-5-[(1 - ethyl - 2(1) -β-naphthothiazolylidene) ethylidene]-3-phenyl-2-thiohydantoin*

5.4 g. of 2-β-acetanilidovinyl-β-naphthothiazole etho-p-toluene sulfonate (1 mol.), 2.5 g. of 1-carboxymethyl - 3 - phenyl-2-thiohydantoin (1 mol.), 2.02 g. of triethylamine (2 mol.), and 50 cc. of ethyl alcohol were refluxed together for 45 minutes. The reaction mixture was cooled to room temperature, and the mixture was made acid with alcoholic hydrogen chloride (0.1 g./cc.). The mixture was chilled to 0° C. and the product filtered off and washed with methyl alcohol and water. The dried dye weighed 2 g. After twice precipitating from methyl alcoholic triethylamine with alcoholic hydrogen chloride, the fine maroon crystals had a M. P. of 226-7° C. with decomposition.

Compound 15 was made similarly to compound 14, using 2-β-acetanilidovinyl-α-naphthothiazole etho-p-toluene sulfonate instead of the β-naphthothiazole.

The photographic emulsion used in the process of our invention is a gelatino silver halide emulsion such as a silver bromide emulsion, a silver bromoiodide emulsion, or a silver chloroiodide emulsion. It need not contain optical sensitizing dyes, although certain sensitizing dyes may be added to it for the purpose of inducing aerial fog, as explained more fully in Fallesen application, Serial No. 780,405. A suitable emulsion is that known as Burton's emulsion, described in Wall, "Photographic Emulsions," 1929, pages 52 and 53. Burton's emulsion is made as follows:

A. Silver nitrate _____grams__ 100
   Water _____cubic centimeters__ 500
   Ammonia—to form clear solution
B. Potassium bromide _____grams__ 80
   Potassium iodide _____do____ 50
   Soft gelatin _____do____ 20
   Water _____cubic centimeters__1,000
C. Dry gelatin _____grams__ 250

B is heated to 70° C. and A, cold, added to B with constant shaking, digested for 20 minutes at 50° C., and allowed to cool slowly. C is added after being allowed to swell for 20 minutes in water, drained, and melted. The emulsion is then set and washed.

An "internal latent image" emulsion, that is, one which forms the latent image mostly inside the silver halide grains, as described on pages 286 and 297 of Mees "The Theory of the Photographic Process," 1942, is especially useful for the process of our invention.

Most of the "internal latent image" emulsions are silver bromo-iodide emulsions of high iodide content, preferably containing at least 10%–20% of iodide. Burton's emulsion is an emulsion of this type, having a silver iodide content of approximately 40% of the content of silver halide. It is not absolutely essential, however, for the emulsion to contain silver iodide.

An "internal latent image" emulsion made as described in Davey and Knott U. S. application, Serial No. 790,232, filed December 6, 1947, may also be used according to our invention. This emulsion is prepared by first forming in the absence of ammonia and in one or more stages silver salt grains consisting at least partly of a silver salt which is more soluble in water than silver bromide, subsequently converting the grains to silver bromide or silver bromoiodide, and if the silver iodide content of the emulsion is less than 6% calculated on the total silver halide, treating such grains with an iodine compound to bring the silver iodide up to at least 6%, ripening preferably in the absence of ammonia and then either washing out some of the soluble salts or washing out the whole of the soluble salts, followed by the addition of soluble salts such as soluble chloride or bromide. An example of an emulsion made in this way is as follows:

Solution No. 1:
   Inert gelatin _____ 20 grams
   KCl _____ 20 grams } at 40° C.
   Water _____ 560 cubic centimeters
Solution No. 2:
   KCl _____ 100 grams
   Water _____ 520 cubic centimeters } at 45° C.
Solution No. 3:
   AgNO₃ _____ 195 grams
   Water _____ 520 cubic centimeters } at 45° C.
Solution No. 4:
   KBr _____ 160 grams
   KI _____ 40 grams
   Water _____ 500 cubic centimeters } at 45° C.

Run solutions Nos. 2 and 3 simultaneously into solution No. 1 in a vessel, taking 90 seconds to do this. Then ripen for 1 minute at 45° C. Next add solution No. 4 then ripen for 20 minutes at 45° C. Next add 235 grams of inert gelatine (dry). Then ripen at 45° C. for 15 minutes during which time the gelatine dissolves. Set and shred the emulsion and then wash until free from all soluble bromide and then add about 150 cc. of 10% solution of KCl (by weight), and then add water to make 3½ litres.

An "internal latent image" type of silver halide emulsion may be defined as one which, when a test portion is exposed to a light intensity scale for a fixed time between $1/100$ and 1 second, and developed for 4 minutes at 20° C. in the ordinary, "surface" developer (Example 1), exhibits a maximum density not greater than $\frac{1}{5}$ the maximum density obtained when the same emulsion is equally exposed and developed for 3 minutes at 20° C. in an "internal" type developer (Example 2). Preferably the maximum density obtained with the "surface" developer is not greater than $\frac{1}{10}$ the maximum density obtained when the same emulsion is developed in the "internal" type developer. Stated conversely, an "internal latent image" emulsion, when developed in an "internal" type developer (Example 2) exhibits a maximum density at least 5, and preferably at least 10, times the maximum density obtained when the same emulsion is exposed in the same way and developed in a "surface" developer (Example 1).

The developer used in the method of our invention should be one which produces oxidation fog or aerial fog. Such developers have been described by Dundon and Crabtree in "American Photography," 1924, vol. 18, page 742. An example of such a developer is a hydroquinone developer containing little or no sulfite, and is illustrated in Example 3.

The "aerial fog" may be produced in the developer in various ways and may be accelerated or intensified by resorting to various expedients. The developer used should preferably have low sulfite ion content and should preferably contain no silver halide solvent more powerful (as a silver halide solvent) than sulfite. Aerial fog may also be increased by bubbling air vigorously through the developer in such manner that the air comes frequently into contact with the emulsion surface of the photograph during development. Certain chemical agents such as copper sulfate incorporated either in the developer or in the emulsion itself may be used to produce or encourage the production of aerial fog. Hydrogen peroxide or certain dyes such as methylene blue increase aerial fog. Fogging agents containing labile sulfur are, however, unsuitable. The fogging action should produce developable surface latent image in the unexposed silver halide grains as explained in the Fallesen patent application Serial No. 780,405.

The acid merocyanine dyes used according to our invention are incorporated in the emulsion before coating in amounts of from 25 to 3000 milligrams of dye per 1000 grams of silver nitrate converted to silver halide. Preferably we use about 375 milligrams of dye per 1000 grams of silver nitrate converted to silver halide.

Our invention is useful both with the aerial fogging developers described in Fallesen application Serial No. 780,405, and also with the developers described in Stauffer U. S. application Serial No. 780,569, now Patent No. 2,497,917, February 21, 1950. The developers of the Stauffer application contain heterocyclic nitrogen containing ring compounds having 5 or 6 atoms in the heterocyclic ring and are so constituted as to increase the maximum density of the positive image obtained in developing solutions capable of producing aerial fog. Typical compounds used in such developers are benzotriazole, methylbenzotriazole, 5-nitro-indazole and 6-nitro-benzimidazole.

An ordinary "surface type" developer, that is, one which develops an image only on the surface of the grains of "internal latent image" emulsions, is the following:

Example 1

| | | |
|---|---|---|
| p-Hydroxyphenylglycine | grams | 10 |
| Sodium carbonate (crystals) | do | 100 |
| Water to | liters | 1 |

Development time, 4 min. at 20° C.

An "internal type" developer, that is, one which develops an image inside the grains of an "internal latent image" emulsion is the following:

Example 2

| | | |
|---|---|---|
| Hydroquinone | grams | 15 |
| Monomethyl-p-aminophenol sulfate | do | 15 |
| Sodium sulfite (anhydrous) | do | 50 |
| Potassium bromide | do | 10 |
| Sodium hydroxide | do | 25 |
| Sodium thiosulfate (crystals) | do | 20 |
| Water to | liters | 1 |

Development time, 3 min. at 20° C.

Our invention will now be described by reference to the following specific examples.

Example 3

To an emulsion such as the Davey and Knott emulsion described above there was added 375 milligrams per 1000 grams of silver nitrate of 1 - carboxymethyl-5-[(3-ethyl-2(3)-benzoxazolylidene) ethylidene] - 3 - phenyl-2-thiohydantoin and the emulsion was coated on a support and dried. It was exposed in an Eastman IIB Sensitometer (Journal Society Motion Picture Engineers, 17, 1931, page 536) and was then developed for four minutes at 68° F. in the following developing solution.

| | | |
|---|---|---|
| Hydroquinone | grams | 10 |
| Sodium sulfite | do | 16 |
| Paraformaldehyde | do | 4 |
| Sodium carbonate | do | 25 |
| Methylbenzotriazole | do | 0.4 |
| Water to | liters | 1 |

Sensitometric curves were obtained from this exposure and from an identically made and processed emulsion without the merocyanine dye. The effect of the dye in increasing the gamma and maximum density of the developed image is shown in the following table.

| | Gamma | Max. Density |
|---|---|---|
| Emulsion without dye | 0.46 | 0.99 |
| Emulsion with dye | 1.3 | 3+ |

Example 4

An emulsion made as described in Example 3 was exposed and developed in the same developer as that used in Example 3 but with a development time of two minutes. When compared with an identical emulsion not containing the merocyanine dye, the resulting image showed increased contrast and maximum density.

Example 5

An emulsion made as described in Example 3 was exposed on an Eastman IIB Sensitometer and was then developed for 12 minutes at 68° F. in the following developing solution.

| | | |
|---|---|---|
| Hydroquinone | grams | 22.5 |
| Sodium sulfite | do | 30 |
| Paraformaldehyde | do | 7.5 |
| Potassium metabisulfite | do | 2.6 |
| Boric acid crystals | do | 7.5 |
| Potassium bromide | do | 1.6 |
| Water to | liters | 1 |

The developer was agitated during the development by forcing air through a sintered glass bubble tube completely submerged in the developer tank. A similar emulsion not containing the merocyanine dye was exposed in the same way and developed for the same length of time in the same solution and under the same conditions. The emulsion containing the merocyanine dye showed increased gamma and maximum density when compared with the emulsion not containing the merocyanine dye.

It will be understood that the compounds and examples included herein are illustrative only and that the appended claims are to be taken as a measure of the invention.

We claim:

1. The method of obtaining a direct positive image in a silver halide emulsion layer, which comprises exposing to light rays to which the emulsion is sensitive, a silver halide emulsion layer containing an acid dye having the general formula:

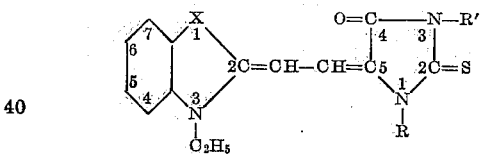

in which X is selected from the class consisting of oxygen and sulfur, R is selected from the class consisting of carboxymethyl and carboxyphenyl, R' is selected from the class consisting of alkyl and phenyl, and at least one of the free positions of the azole nucleus contains a substituent selected from the class consisting of hydrogen, methyl, methoxy, hydroxy, chloro, carbethoxy, fused-on benzene ring in the 4,5-position, and fused-on benzene ring in the 6,7-position, a test portion of which layer upon exposure to a light intensity scale for a fixed time between 1/100 and 1 second and development for 3 minutes at 20° C., in the following internal type developer:

| | | |
|---|---|---|
| Hydroquinone | grams | 15 |
| Monomethyl-p-aminophenol sulfate | do | 15 |
| Sodium sulfite (anhydrous) | do | 50 |
| Potassium bromide | do | 10 |
| Sodium hydroxide | do | 25 |
| Sodium thiosulfate (crystals) | do | 20 |
| Water to | liters | 1 |

Development time, 3 min. at 20° C.

gives a maximum density at least 5 times the maximum density obtained when the equally exposed silver halide emulsion is developed for 4 minutes at 20° C. in the following surface developer:

| | | |
|---|---|---|
| p-Hydroxyphenylglycine | grams | 10 |
| Sodium carbonate (crystals) | do | 100 |
| Water to | liters | 1 |

Development time, 4 min. at 20° C.

and developing the unexposed portion of said emulsion layer in a developing solution which produces aerial fog.

2. The method of obtaining a direct positive image in a silver halide emulsion layer, which comprises exposing to light rays to which the emulsion is sensitive, a silver halide emulsion layer containing a 5-[(3-ethyl-2(3)-benzoxazolylidene)-ethylidene]-2-thiohydantoin dye having a carboxymethyl group in the 1-position of the thiohydantoin ring, and an alkyl group in the 3-position of the thiohydantoin ring, a test portion of which layer upon exposure to a light intensity scale for a fixed time between 1/100 and 1 second and development for 3 minutes at 20° C. in the following interval type developer:

| | |
|---|---|
| Hydroquinone | grams.. 15 |
| Monomethyl-p-aminophenol sulfate | do.... 15 |
| Sodium sulfite (anhydrous) | do.... 50 |
| Potassium bromide | do.... 10 |
| Sodium hydroxide | do.... 25 |
| Sodium thiosulfate (crystals) | do.... 20 |
| Water to | liters.. 1 |

Development time, 3 min. at 20° C.

gives a maximum density at least 5 times the maximum density obtained when the equally exposed silver halide emulsion is developed for 4 minutes at 20° C in the following surface developer:

| | |
|---|---|
| p-Hydroxyphenylglycine | grams.. 10 |
| Sodium carbonate (crystals) | do.... 100 |
| Water to | liters.. 1 |

Development time, 4 min. at 20° C.

and developing the unexposed portion of said emulsion layer in a developing solution which produces aerial fog.

3. The method of obtaining a direct positive image in a silver halide emulsion layer, which comprises exposing to light rays to which the emulsion is sensitive, a silver halide emulsion layer containing a 5-[(3-ethyl-2(3)-benzoxazolylidene)-ethylidene]-2-thiohydantoin dye having a carboxymethyl group in the 1-position of the thiohydantoin ring, and a phenyl group in the 3-position of the thiohydantoin ring, a test portion of which layer upon exposure to light intensity scale for a fixed time between 1/100 and 1 second and development for 3 minutes at 20° C. in the following internal type developer:

| | |
|---|---|
| Hydroquinone | grams.. 15 |
| Monomethyl-p-aminophenol sulfate | do.... 15 |
| Sodium sulfite (anhydrous) | do.... 50 |
| Potassium bromide | do.... 10 |
| Sodium hydroxide | do.... 25 |
| Sodium thiosulfate (crystals) | do.... 20 |
| Water to | liters.. 1 |

Developed time, 3 min. at 20° C.

gives a maximum density at least 5 times the maximum density obtained when the equally exposed silver halide emulsion is developed for 4 minutes at 20° C. in the following surface developer:

| | |
|---|---|
| p-Hydroxyphenylglycine | grams.. 10 |
| Sodium carbonate (crystals) | do.... 100 |
| Water to | liters.. 1 |

Development time, 4 min. at 20° C.

and developing the unexposed portion of said emulsion layer in a developing solution which produces aerial fog.

4. The method of obtaining a direct positive image in a silver halide emulsion layer, which comprises exposing to light rays to which the emulsion is sensitive, a silver halide emulsion layer containing a 5-[(3-ethyl-2(3)-benzoxazolylidene)-ethylidene]-2 thiohydantoin dye having a carboxyphenyl group in the 1-position of the thiohydantoin ring, and a phenyl group in the 3-position of the thiohydantoin ring, a test portion of which layer upon exposure to a light intensity scale for a fixed time between 1/100 and 1 second and development for 3 minutes at 20° C. in the following internal type developer:

| | |
|---|---|
| Hydroquinone | grams.. 15 |
| Monomethyl-p-aminophenol sulfate | do.... 15 |
| Sodium sulfite (anhydrous) | do.... 50 |
| Potassium bromide | do.... 10 |
| Sodium hydroxide | do.... 25 |
| Sodium thiosulfate (crystals) | do.... 20 |
| Water to | liters.. 1 |

Development time, 3 min. at 20° C.

gives a maximum density at least 5 times the maximum density obtained when the equally exposed silver halide emulsion is developed for 4 minutes at 20° C. in the following surface developer:

| | |
|---|---|
| p-Hydroxyphenylglycine | grams.. 10 |
| Sodium carbonate (crystals) | do.... 100 |
| Water to | liter.. 1 |

Development time, 4 min. at 20° C.

and developing the unexposed portion of said emulsion layer in a developing solution which produces aerial fog.

5. The method of obtaining a direct positive image in a silver halide emulsion layer, which comprises exposing to light rays to which the emulsion is sensitive, a silver halide emulsion layer containing an acid dye having the general formula:

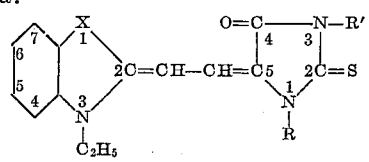

in which X is selected from the class consisting of oxygen and sulfur, R is selected from the class consisting of carboxymethyl and carboxyphenyl, R' is selected from the class consisting of alkyl and phenyl, and at least one of the free positions of the azole nucleus contains a substituent selected from the class consisting of hydrogen, methyl, methoxy, hydroxy, chloro, carbethoxy, fused-on benzene ring in the 4,5-position, and fused-on benzene ring in the 6,7-position, a test portion of which layer upon exposure to a light intensity scale for a fixed time between 1/100 and 1 second and development for 3 minutes at 20° C., in the following internal type developer:

| | |
|---|---|
| Hydroquinone | grams.. 15 |
| Monomethyl-p-aminophenol sulfate | do.... 15 |
| Sodium sulfite (anhydrous) | do.... 50 |
| Potassium bromide | do.... 10 |
| Sodium hydroxide | do.... 25 |
| sodium thiosulfate (crystals) | do.... 20 |
| Water to | liters.. 1 |

Development time, 3 min. at 20° C.

gives a maximum density at least 5 times the maximum density obtained when the equally exposed silver halide emulsion is developed for 4 minutes at 20° C., in the following surface developer:

p-Hydroxyphenylglycine _____ grams__ 10
Sodium carbonate (crystals) _____do___ 100
Water to _____liters__ 1
Development time, 4 min. at 20° C.

and developing the unexposed portion of said emulsion layer in a developing solution which produces aerial fog, and containing a heterocyclic, nitrogen-containing ring compound having at least 5 but not more than 6 atoms in the heterocyclic ring.

6. The method of obtaining a direct positive image in a silver halide emulsion layer, which comprises exposing to light rays to which the emulsion is sensitive, a silver halide emulsion layer containing an acid merocyanine dye having the general formula:

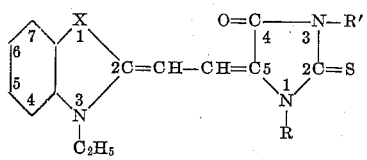

in which R is selected from the class consisting of carboxymethyl and carboxyphenyl, R' is selected from the class consisting of alkyl and phenyl, and at least one of the free positions of the benzoxazole nucleus contains a substituent selected from the class consisting of hydrogen, methyl, methoxy, hydroxy, chloro, carbethoxy, fused-on benzene ring in the 4,5 position, and fused-on benzene ring in the 6,7 position, a test portion of which layer upon exposure to a light intensity scale for a fixed time between $1/100$ and 1 second and development for 3 minutes at 20° C., in the following internal type developer:

Hydroquinone _____grams__ 15
Monomethyl-p-aminophenol sulfate__do____ 15
Sodium sulfite (anhydrous) _____do____ 50
Potassium bromide_____do____ 10
Sodium hydroxide_____do____ 25
Sodium thiosulfate (crystals) _____do____ 20
Water to _____liters__ 1
Development time, 3 min. at 20° C.

gives a maximum density at least 5 times the maximum density obtained when the equally exposed silver halide emulsion is developed for 4 minutes at 20° C. in the following surface developer:

p-Hydroxyphenylglycine _____grams__ 10
Sodium carbonate (crystals) _____do____ 100
Water to_____liters__ 1
Development time, 4 min. at 20° C.

and developing the unexposed portion of said emulsion layer in a developing solution which produces aerial fog, and containing benzotriazole.

GEORGE EARLE FALLESEN.
JOHN SPENCE.

No references cited.